Patented Dec. 1, 1953

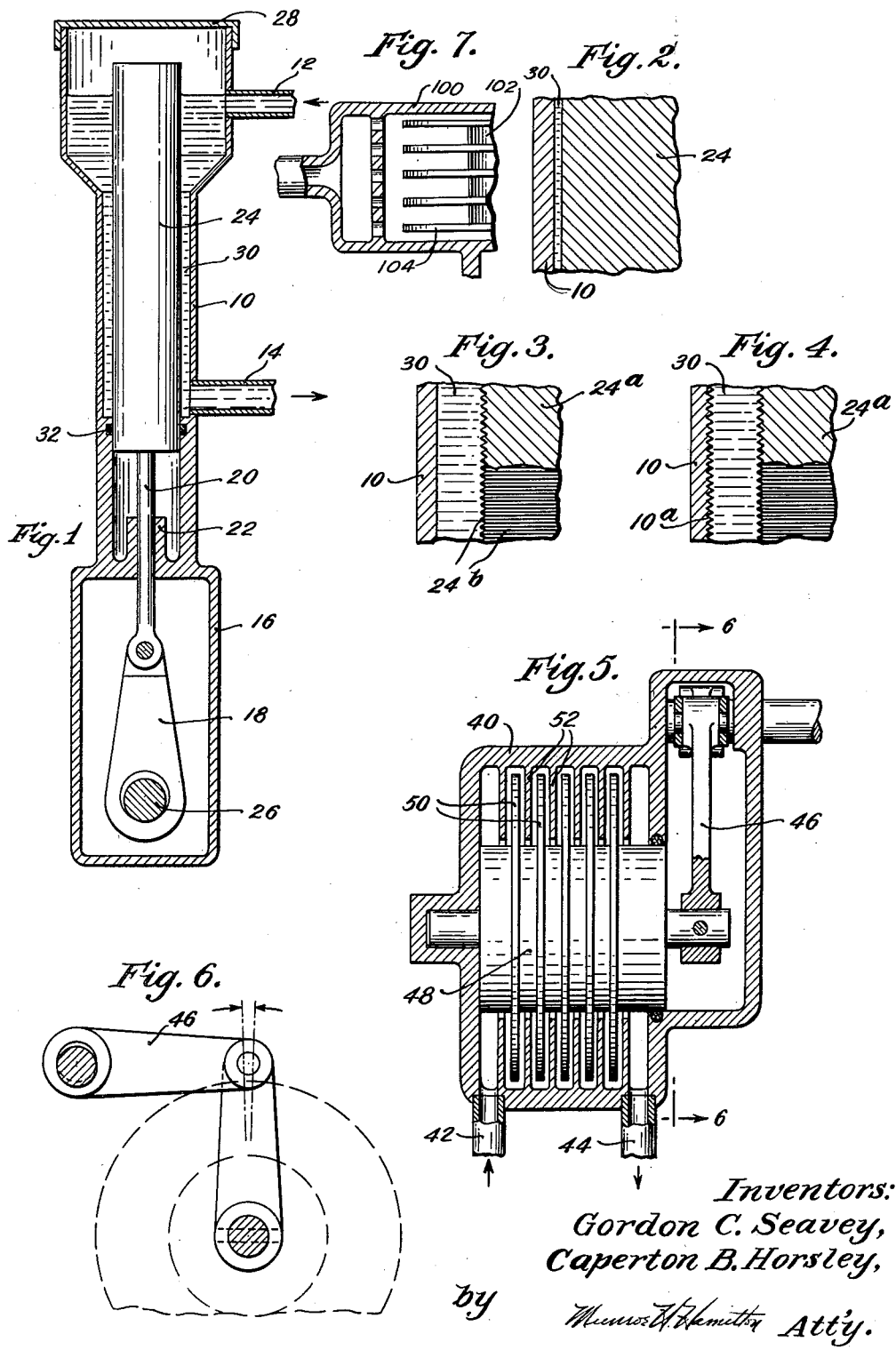

2,661,192

UNITED STATES PATENT OFFICE 2,661,192

MEANS FOR TREATING MATERIALS WITH INTENSE ALTERNATING SHEAR FORCES

Caperton B. Horsley, Westwood, and Gordon C. Seavey, Arlington, Mass., assignors to Sonic Research Corporation, Boston, Mass., a corporation of Massachusetts Application August 11, 1949, Serial No. 109,672

10 Claims. (Cl. 259—4)

This invention relates to equipment for treating liquids, emulsions, hydrosols, slurries and other mixtures wherein a fluid body is subjected to oscillatory or vibrating effects in order to modify and improve the properties or characteristics of the treated substances. For convenience we have applied the term "fluent materials" to these emulsions, hydrosols, slurries, etc., which are capable of treatment using our novel apparatus.

In the art of treating and handling fluid mixtures, there are many instances where more effective methods are desired for refining, breaking up, and dispersing solid bodies contained in such mixtures, either from the point of view of attaining a finer state of subdivision; or of carrying out subdivision more cheaply and quickly; or of creating a more stable and permanent colloid suspension; or in various other respects. Likewise one finds that there is a need for better ways of combining liquid mixtures as in creating emulsions of two immiscible liquids and similar proceedings.

One proposal for meeting the need indicated has been the treatment of liquid mixtures by oscillatory forces such as those accompanying sound waves. Attempts to carry out this proposal in commercial scale operations have not produced satisfactory results, owing in part to inadequacy of conventional sound generating apparatus and in part to failure to appreciate the relative influence of such factors accompanying sound as the cyclic variations in pressure, acceleration and shear.

It is a general object of the invention, therefore, to deal with the overall problem outlined and more particularly to devise improved instrumentalities for utilizing oscillating effects whereby cheaper, faster and more efficient processing of fluid mixtures may be realized.

In seeking to realize the objectives noted and in the course of extensive experimentation with oscillating forces, we have observed that in the case of some types of fluid mixtures, there occur significant physical changes which are not particularly related nor explained by the influence of such concomitants of sound as oscillatory pressure and acceleration. This has led us to investigate another concomitant of sound referred to above, namely, alternating shear.

We have found that in specific types of fluid mixtures just above alluded to, the observed physical changes are very materially related to and dependent upon the action of alternating shear, and we have further discovered that by developing alternating shear in a properly chosen manner in a fluid body, we may bring about desirable physical changes on a commercial scale.

Thus we find that highly novel and unexpected results may be obtained when a liquid mixture is subjected to shear forces which are caused to alternate rapidly in intensity and direction. More specifically, we find that by causing a liquid body to pass through an oscillating shear field where alternating shear forces are maintained, we are enabled to break up and disperse solids such as fibres, pigment particles, and the like, to an extent not heretofore realized as well as achieving various other desirable objectives.

As one example, we find that if a liquid body is confined in or caused to flow through a narrow passageway between two solid surfaces, one of which surfaces is stationary, the other surface being vibratory in a direction parallel to the surfaces, there will be set up, by reason of the frictional contact of the surfaces on contacting liquid portions, alternating shear forces which produce desirable results. The shear forces may be controlled in various ways as by varying the spacing between the solid surfaces or the frequency or amplitude of the vibratory member; or by increasing the frictional contact of one or both of the solid bodies on the fluid with the aid of roughened or interrupted surfaces; or in other ways.

Development of the desired forces of rapidly alternating shear, in a manner consistent with our purpose to achieve results economically, is an important feature of the invention. In this connection, we show a specially devised oscillatory device so constructed as to produce substantially only intense alternating shear forces in the material being treated without the production of other unwanted vibratory components.

These and other objects and novel features of the invention will be more fully understood and appreciated with reference to the accompanying drawings, in which:

Fig. 1 is a cross-sectional view of one form of fluid treating mechanism in which alternating shear may be developed and in which is included a stationary fluid containing member, and a reciprocating piston arranged to oscillate in spaced relation to the stationary member;

Figs. 2, 3 and 4 are enlarged detail cross-sectional views illustrating several different types of oscillating surfaces which may be employed in an apparatus of the type shown in Fig. 1;

Fig. 5 is a cross-sectional view of another alternating shear apparatus operating by oscillatory rotation and consisting as in the case of the device shown in Fig. 1 of a stationary element and a movable member;

Fig. 6 is a detail elevational view of a crank mechanism provided with an eccentric bearing to provide for oscillatory rotation of the apparatus of Fig. 5; and Fig. 7 indicates a modification of the shear mechanism of Fig. 5.

It is contemplated that the apparatus of the invention may be employed in any one of several different ways, but in further describing the invention in a suitably detailed fashion, it is convenient to consider one specific application with it being understood that this is not done with the intention of limiting the invention in any way thereto.

Thus one preferred application is in connection with the refining of paper pulp preparatory to forming a sheet of paper. As is well known, it is customary to treat pulp fibres in a beater or "Jordan" in order to break up the pulp fibres. Important factors in this type of process are the cost of the power and equipment required to reach satisfactory degrees of refinement.

In accordance with the invention, we treat an aqueous suspension of pulp fibres with alternating shear forces in order to break up and refine the pulp fibres. Thus the method of our invention is applied at such a stage in the paper making process as to supplant the beaters or "Jordans" used in present practice.

We shall explain our invention by describing first the operation of a relatively simple structure such as that shown in Fig. 1 of the drawings, in which numeral 10 denotes a fluid container provided with an inlet pipe 12 and an outlet pipe 14. The container body may also include a cover 28 and an extension 16 in which is received a driving crank mechanism, including crank shaft 26 which is driven from some external source of power. This crank shaft is connected by link 18 to rod 20 which is reciprocally mounted in guide bearing 22, and which has its extremity fastened to an oscillating cylinder 24.

The oscillating cylinder 24 is chosen of a diameter which is substantially less than the inner diameter of the cylindrical portion of the container 10 to provide a passageway 30 in which a fluid mixture of pulp fibres and water may be contained, as is diagrammatically shown in the drawings. As fluid material moves into the top of the container by means of the inlet 12, it is guided along as a relatively thin body which flows between the oscillating cylinder and the container and out through the outlet member 14. A sealing member 32 is provided to prevent fluid from passing by the end of the oscillating cylinder at the bottom end thereof.

In operation the crank mechanism described drives the oscillating cylinder back and forth in the container, and in so doing there is produced an alternating shear effect resulting from the fact that the oscillating cylinder surface lying in contact with the fluid tends to move portions of the fluid in an oscillatory manner while those portions of the fluid lying in contact with the immediately adjacent container wall tend to remain at rest. Thus, in the relatively narrow passageway formed by the two closely adjacent solid surfaces, there is achieved a stress field which is capable of acting upon the fluid in such a way as to bring about the desirable results enumerated earlier.

As illustrative of operating conditions, there may be cited the use of one device of the character described in which the travel of the oscillating cylinder was approximately .090 inch, i. e., a travel of plus or minus .045 inch from its mean position. Frequencies were employed of from approximately 90 to 200 C. P. S. (cycles per second).

It will be apparent, however, that for various conditions and various machines, travel of the vibratory member may vary over a wide extent. It is estimated that the alternating shear treatment may be effectively utilized in a frequency range running from 10 C. P. S. or slightly lower up to 10,000 C. P. S. or higher. Although there has been shown a mechanism whereby the oscillating cylinder is driven by a crank shaft, it will be obvious that various other driving arrangements may be employed in the practice of this invention.

It is also obvious that the invention may be practiced by inducing relative movement in other ways; for example, alternating shear force may be developed simply by oscillating a surface in a fluid body, the relative movement being provided by the inertia of the bulk of fluid without requiring a stationary surface to retard the movement of the liquid or by alternately pumping the fluid back and forth between two stationary surfaces.

We have also found that in some cases, particularly when treating aqueous suspensions of pulp paper fibres, we can increase the extent of the effective alternating shear field by interrupting, or by roughening or scoring, as by means of threads for example, the peripheral surface of the oscillating cylinder 24. Under certain conditions, it may also be desirable to roughen the stationary surface. The effect of the roughened surface in this connection is to provide greater adhesion between the pulp fibres and the surface, and thus further extend the alternating shear region into the body of the pulp slurry, thus permitting a greater spacing between surfaces, and increasing the volume of slurry treated per unit of oscillating area.

In Figs. 2, 3 and 4, we have disclosed three different surface arrangements. In Fig. 2, there is shown the oscillating cylinder 24 and the container 10, both of which have smooth surfaces in contact with fluid material in the passageway 30. In Fig. 3, however, the oscillating cylinder 24a has a surface roughened by threads 24b while the container 10 is left smooth. In Fig. 4 are illustrated both the roughened oscillating cylinder surface 24b and threads 10a on the container wall 10.

In Figs. 5 and 6, we have illustrated another form of alternating shear device, consisting of a fluid container 40, having an inlet pipe 42 for receiving a fluid material, and an outlet pipe 44 for remitting the fluid material. A crank mechanism 46 is mounted at one side of the container body to provide for oscillatory rotation of a rotor body 48, around the periphery of which in axially spaced relation are a number of radially extending flanges 50 adapted to be interposed between similar annular flanges 52 which are formed on the inner peripheral surface of the container 40. This arrangement again provides for a number of closely adjacent surfaces between which fluid materials may pass as a relatively thin fluid body.

In operation, when oscillatory rotation of the rotor is produced by means of a crank mechanism acting on arm 46, fluid material lying between any one of the stationary plates 52 and the oscillating flanges 50, will be subjected to alternating shear in the same manner as was described in connection with Fig. 1.

In Fig. 7 we have shown one other alternate disc arrangement in which the container 100 is formed without flanges and the rotor 102 has a series of flanges 104 formed thereon in suitably spaced relation to produce the desired alternating shear effect as described previously, utilizing the inertia effect of the body of the liquid.

One or more of the material contacting surfaces of the flanges 50 and 52 in Fig. 5 as well as of the flanges 104 in Fig. 7 may be smooth or roughened as illustrated in Figs. 2, 3 and 4, for the purpose of increasing the adhesion thereto of the treated material.

It has been found that by means of the use of alternating shear, refinement of paper pulp fibres can be carried out with significantly less power than is required by equipment now conventionally employed.

As examples of other applications where alternating shear may be desirably employed, there may be cited breaking and dispersing pigments in liquids such as for example carbon black utilized in manufacturing printers' inks. Results have indicated that with alternating shear, it is possible to use carbon black in the form of relatively large solid pellets suspended in the ink vehicle, and carry out a higher degree of dispersion than has heretofore been feasible with conventional equipment. Various other applications have also been successfully tested, such as the disruption of cells, for example starch cells; also formation of unusually stable emulsions of oil and water and other normally immiscible substances; also control of the growth of microorganisms, and other applications.

Having thus disclosed our invention and described in detail illustrative embodiments thereof, we claim as new and desire to secure by Letters Patent:

1. A device for treating fluent materials with intense alternating shear forces which comprises a closed container whose walls define a confined treating chamber adapted to hold said material, said container having inlet and outlet ports communicating with said chamber permitting the flow therethrough of said material for treatment, a treating member in said chamber, mountings for said treating member permitting vibration thereof in a predetermined mode of vibration, said member having an extended treating surface adapted to contact said material in said chamber, and vibratory driving mechanism connected in driving relation to said member for rapidly vibrating said surface as a whole according to said predetermined mode of vibration alternately in opposite directions so that every portion thereof moves substantially only within the boundary between said material and said surface for producing substantially only intense alternating shear forces in the material adjacent thereto.

2. A device for treating fluent materials with intense alternating shear forces which comprises a closed container whose walls define a confined treating chamber adapted to hold said material, said container having inlet and outlet ports communicating with said chamber permitting the flow therethrough of said material for treatment, a treating member in said chamber, mountings for said treating member permitting vibration thereof in a predetermined mode of vibration, said member having an extended treating surface for contacting said material, all portions of said treating surface constituting surfaces of rotation with the same axis, and vibratory driving mechanism connected in driving relation to said member for rapidly vibrating said treating surface as a whole upon said axis according to said predetermined mode of vibration in opposite directions so that every portion thereof moves substantially only within the boundary between said material and said treating surface for producing substantially only intense alternating shear forces in the material adjacent thereto.

3. A device for treating fluent materials with intense alternating shear forces which comprises a closed container whose walls define a confined treating chamber adapted to hold said material, said container having inlet and outlet ports communicating with said chamber permitting the flow therethrough of said material for treatment, a treating member in said chamber, mountings for said treating member permitting rotational oscillation thereof about a predetermined axis, said member having an extended treating surface in spaced relation to said walls for contacting said material, all portions of said treating surface constituting surfaces of rotation upon said predetermined axis, and vibratory driving mechanism connected in driving relation to said member for rapidly oscillating said treating surface as a whole alternately in opposite directions rotationally upon said axis so that every portion thereof moves substantially only within the boundary between said material and said treating surface for producing substantially only intense alternating shear forces in the material adjacent thereto.

4. A device for treating fluent materials with intense alternating shear forces which comprises a closed container whose walls define a confined cylindrical treating chamber adapted to hold said material, said container having inlet and outlet ports communicating with said chamber permitting the flow therethrough of said material for treatment, a cylindrical treating member in said chamber and in spaced relation to the walls thereof, mountings for said treating member permitting rotational oscillation thereof about its major axis, said member having a series of outwardly directed fins providing an extended treating surface for contacting said material, all portions of said treating surface constituting surfaces of rotation upon said axis, and vibratory driving mechanism connected in driving relation to said member for rapidly oscillating said treating surface as a whole alternately in opposite directions rotationally upon said axis so that every portion thereof moves substantially only within the boundary between said material and said treating surface for producing substantially only intense alternating shear forces in the material adjacent thereto.

5. Apparatus in accordance with claim 4 in which the surfaces of at least some of said fins are roughened to increase the adhesion between such roughened surfaces and said material.

6. A device for treating fluent materials with intense alternating shear forces which comprises a closed container whose walls define a confined cylindrical treating chamber adapted to hold said material, said container having inlet and outlet ports communicating with said chamber permitting the flow therethrough of said material for treatment, a cylindrical treating member in said chamber and in spaced relation to the walls thereof, mountings for said treating member permitting rotational oscillation thereof about its major axis, said member having a series of outwardly directed fins providing an extended treating surface for contacting said material, all portions of said treating surface constituting surfaces of rotation upon said axis, said walls of said chamber having inwardly directed flange portions spaced from each other and extending between and substantially parallel to said fins and defining therewith a series of relatively restricted passageways for said fluent material, and vibratory driving mechanism connected in driving relation to said member for rapidly oscillating said treating surface as a whole alternately in opposite directions rotationally upon said axis so that every portion thereof moves substantially only within the boundary between said material and said treating surface for producing substantially only intense alternating shear forces in the material adjacent said surface.

7. Apparatus in accordance with claim 6 in which the surfaces of at least some of said fins are roughened to increase the adhesion between such roughened surfaces and said material.

8. Apparatus in accordance with claim 7 in which the surfaces of at least some of said flange portions are also roughened.

9. A device for treating fluent materials with intense alternating shear forces which comprises a closed container whose walls define a confined cylindrical treating chamber adapted to hold said material, said container having inlet and outlet ports communicating with said chamber permitting the flow therethrough of said material for treatment, a cylindrical treating member in said chamber and in spaced relation to the walls thereof, mountings for said treating member permitting reciprocation thereof in the direction of its major axis, only the cylindrical surface of said member constituting an extended treating surface in spaced relation to the corresponding wall of said chamber and adapted to contact said material, and vibratory driving mechanism connected in driving relation to said member for rapidly reciprocating said treating surface as a whole alternately in opposite directions along said axis so that every portion thereof moves substantially only within the boundary between said material and said treating surface for producing substantially only intense alternating shear forces in the material adjacent thereto.

10. A device for treating fluent materials with intense alternating shear forces which comprises a closed container whose walls define a confined cylindrical treating chamber adapted to hold said material, said container having inlet and outlet ports communicating with opposite ends of said chamber permitting the flow therethrough of said material for treatment, a cylindrical treating member in said chamber and in spaced relation to the walls thereof, mountings for said treating member permitting rotational oscillation thereof about its major axis, said member having a series of radially outwardly directed fins providing an extended treating surface for contacting said material, all portions of said treating surface constituting surfaces of rotation upon said axis, said walls of said chamber having a series of radially inwardly directed flange portions spaced from each other and extending between and substantially parallel to said fins and defining therewith a series of relatively restricted passageways for said fluent material, and vibratory driving mechanism including a crank and eccentric connected in driving relation to said member for rapidly oscillating said treating surface as a whole alternately in opposite directions rotationally upon said axis so that every portion thereof moves substantially only within the boundary between said material and said treating surface for producing substantially only intense alternating shear forces in the material adjacent said surface.

CAPERTON B. HORSLEY.
GORDON C. SEAVEY.

References Cited in the file of this patent

UNITED STATES PATENTS

| Number | Name | Date |
|---|---|---|
| 310,940 | Gould | Jan. 20, 1885 |
| 931,316 | Kirksey | Aug. 17, 1909 |
| 954,114 | Lappen | Apr. 5, 1910 |
| 1,225,874 | Shartle | May 15, 1917 |
| 1,848,100 | Benner | Mar. 8, 1932 |
| 1,992,938 | Chambers | Mar. 5, 1935 |
| 2,076,991 | Holgersson et al. | Apr. 13, 1937 |
| 2,102,004 | Hutchins | Dec. 14, 1937 |
| 2,115,123 | Russell | Apr. 26, 1938 |
| 2,169,338 | Ditto | Aug. 15, 1939 |
| 2,225,797 | Plauson | Dec. 24, 1940 |
| 2,333,456 | Wynn | Nov. 2, 1943 |
| 2,478,207 | Robinson | Aug. 9, 1949 |